Aug. 31, 1965   P. D. GILBERT   3,203,544
DISPENSER FOR THERMOSETTING RESIN IMPREGNATED TAPE
Filed Feb. 11, 1963

Inventor
PETER DEREK GILBERT

By Eugene E. Stevens and/or
Raymond H. Stevens

Attorneys

United States Patent Office 3,203,544
Patented Aug. 31, 1965

3,203,544
DISPENSER FOR THERMOSETTING RESIN IMPREGNATED TAPE
Peter Derek Gilbert, Chandler's Ford, England, assignor to Pirelli General Cable Works Limited, London, England, a British company
Filed Feb. 11, 1963, Ser. No. 257,686
Claims priority, application Great Britain, Mar. 15, 1962, 9,946
3 Claims. (Cl. 206—47)

The present invention relates to the use of thermosetting resins for the purpose, for instance, of electrical insulation, sealing, mechanical or anti-corrosion protection or waterproofing. By reason of the nature of such materials, it is desirable to avoid, as far as possible, the necessity for their being handled, and it is one of the main objects of the invention to achieve this end, as well as to render feasible the application of thermosetting resins for the above and other purposes by relatively unskilled labour.

According to the invention, a length of flexible porous tape is contained within a box, referred to below as a dispenser, into which there may be injected a quantity of a thermosetting resin, charged with a hardening agent, sufficient to impregnate the tape, which may then be withdrawn through a slot in the wall of the dispenser for use as required. In order that the correct quantity of the impregnating medium may be supplied, it is preferred that the resin and the hardener be contained in separate vessels, so that, immediately before impregnation is effected, the hardener may be poured into the vessel containing the resin through a nozzle in that vessel, which is then shaken or the contents stirred to secure thorough admixture of the ingredients: the resulting activated resin is then injected into the dispenser. To facilitate these actions, the dispenser, which is preferably of transparent material, is provided with an injection port having a removable sealing plug, and the vessel containing the resin is of flexible material shaped as a bottle so that it may be readily squeezed to force the activated resin into the dispenser: the sealing plug is then replaced. The filling nozzle of the bottle may be fitted with a screwed stopper, after removal of which the screw thread on the nozzle serves, by engaging a complementary thread around the injection port, to effect the required connection with the dispenser.

The tape within the dispenser is preferably in the form of a coil, the dispenser being of cylindrical shape with the slot for withdrawal of the tape in its periphery. The width of this slot may be made adjustable so that, on emergence of the tape, the thickness of the resin coating on it may be controlled, the degree of impregnation being sufficient to allow of this action. On withdrawal of the tape, it may be applied, with the minimum of handling, in the position in which it is required, for example, around an electric cable joint, the tension of the tape being regulated by hand pressure exerted on the walls of the dispenser, preferably made with a degree of flexibility for this purpose.

As an alternative, the dispenser might be made in the form of an annulus, this shape being particularly suitable when the tape is to be wound individually around two or more parallel cable cores the space between which is restricted.

In order that the invention may be clearly understood and readily carried into effect, reference is made to the accompanying drawing which illustrates, by way of example, two forms of dispenser in accordance therewith and wherein.

Figure 1:
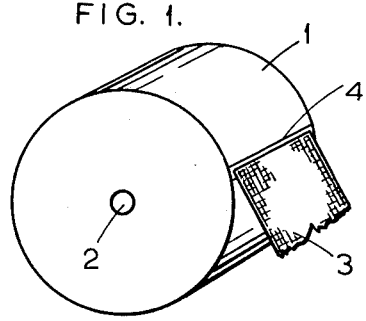
FIGURE 1 is a perspective view of a cylindrical dispenser.

Referring to FIGURE 1, the dispenser illustrated, preferably of transparent material, is in the form of a cylindrical box 1 having an injection port 2, screw-threaded for the reception of a complementary shaped nozzle fitted to a vessel in which the thermosetting resin, previously charged with a hardening agent as above described is supplied. After transfer of the resin from this vessel to the dispenser, the port 2 is closed by a threaded plug.

The tape 3 to be impregnated, in the form of a coil, is inserted in the dispenser 1 previously to injection of the resin, means, not illustrated in the drawing, being provided to allow of this action. As indicated, the end of the tape is threaded through a slot 4 in the cylindrical surface of the dispenser 1, the tape being withdrawn from this slot as required to perform a winding operation. For the above-mentioned purpose, by means not shown, the slot 4 is made adjustable in width in the direction of the thickness of the tape 3.

Figure 2:
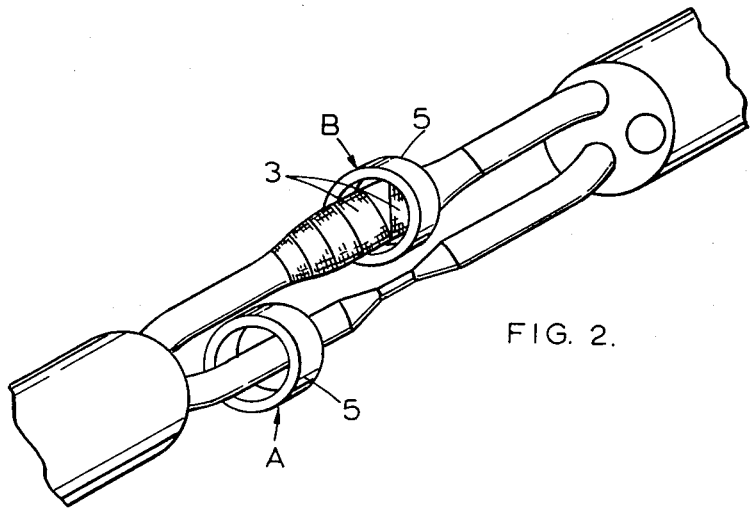
FIGURE 2 shows in perspective an annular dispenser and one mode of its use.

FIGURE 2 depicts a dispenser 5 of annular shape, the slot for withdrawal of the tape 3 being in the internal periphery. In the use of this form of dispenser for the winding of tape around the individual cores in the jointing of a multi-core cable as illustrated, the dispenser, containing a coil of tape and previously charged with impregnant, is slipped over one of the cores prior to jointing as shown at A'. After the conductors in a pair of cores have been joined, taping is carried out, as indicated at B, by rotating the dispenser 5 in its own plane around the core and in this manner dispensing the tape 3 and winding it around the core the dispenser of FIG. 2 may be removed in any suitable manner after the joint is formed, for example, by cutting it off the conductors which have been joined.

Typical applications for the invention are:

(1) To electric cable joints or terminations in which the impregnated tape is bound over the cores or core and sheaths or sheath and finally covered with an adhesive plastic tape. This overall binding forces the surplus resins into the centre of the cores and completely fills the joint or termination, and provides a waterproof and electrically insulating cover without need for a mould. Stress-control rings may be included during the taping operation and preformed water sheds secured in position to permit of outdoor working;

(2) For protection from chemical attack of metal joint cases buried in the soil, by binding with the impregnated tape;

(3) For mechanical protection of joints in cases where a lead sleeve, encasing the jointed cores of a lead- or aluminum-sheathed cable, is plumbed to the cable sheath and requires protection; the impregnated tape and binding material would strengthen vulnerable points;

(4) In cable sheath repairs where a sheath, plastic or metallic, damaged during installation, may be repaired to give complete protection from water ingress by binding the damaged area with the impregnated tape;

(5) For anti-corrosion protection of buried metallic pipes.

The tape employed in the method of the invention may be of any suitable material but for cable-jointing application is preferably of a plastic. If a polyethylene tape is employed, e.g. an open mesh tape consisting of a network of solid polyethylene filaments, it is important that the tape surface be oxidized in order that a perfect bond be attained subsequently between the tape and the resin. Such surface oxidation can be carried out in various well-known manners, e.g. by contacting the tape with a chemical oxidant solution, before assembling the tape in the dispenser.

With such a tape the resin may conveniently be a thixotropic epoxy resin composition.

What I claim and desire to secure by Letters Patent of the United States is:

1. A dispensing container for impregnating an endless length of a tape with a thermosetting resin fluid to be wrapped about joint or the like, comprising a hollow container including an annular peripheral wall, said container being flexible and manually deformable, said annular wall including a transverse slot therethrough and communicating with the interior of said container, means on said container for filling the container with a thermosetting resin fluid, an activated thermosetting fluid in said container for impregnating a roll of tape disposed in said container, and a convoluted roll of tape in said container and having a leading end extending out of the slot and embracingly engaged thereby, said annular container wall being manually deformable for normally deforming said slot and manually regulating the tension on the tape and controlling the layer of the fluid coated on the tape when it is withdrawn from the container.

2. The structure as claimed in claim 1, wherein and in which said container is a closed cylinder having opposed parallel side walls, one of said side walls having said means for filling the container formed thereon, said annular peripheral wall comprising the outer periphery of said container.

3. The structure as claimed in claim 1, in which said container is closed annulus and includes an inner peripheral wall in which said slot is formed.

References Cited by the Examiner
UNITED STATES PATENTS

| | | | |
|---|---|---|---|
| 1,351,441 | 8/20 | Pond | 206—63.2 |
| 2,082,490 | 6/37 | Goldsmith | 206—77 |
| 2,463,285 | 3/49 | Killian | 118—419 |
| 2,682,872 | 7/54 | Bower | 206—63.2 |
| 2,864,492 | 12/58 | Lappala | 206—47 |
| 2,879,931 | 3/59 | Simons | 206—52 |
| 2,956,613 | 10/60 | Edelman et al. | |
| 3,087,606 | 4/63 | Bollmeirer et al. | 206—47 |

THERON E. CONDON, *Primary Examiner.*

EARLE J. DRUMMOND, *Examiner.*